(12) United States Patent
Li et al.

(10) Patent No.: US 11,523,170 B2
(45) Date of Patent: Dec. 6, 2022

(54) METHOD FOR DISPLAYING VIDEOS, AND STORAGE MEDIUM AND ELECTRONIC DEVICE THEREOF

(71) Applicant: BEIJING DAJIA INTERNET INFORMATION TECHNOLOGY CO., LTD., Beijing (CN)

(72) Inventors: Zhao Li, Beijing (CN); Hongyi Jia, Beijing (CN); Yanan Niu, Beijing (CN)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/034,292

(22) Filed: Sep. 28, 2020

(65) Prior Publication Data

US 2021/0099751 A1    Apr. 1, 2021

(30) Foreign Application Priority Data

Sep. 27, 2019   (CN) ......................... 201910926356.0

(51) Int. Cl.
| | |
|---|---|
| H04N 21/466 | (2011.01) |
| H04N 21/482 | (2011.01) |
| H04N 21/472 | (2011.01) |
| H04N 21/462 | (2011.01) |
| H04N 21/47 | (2011.01) |
| H04N 21/431 | (2011.01) |
| G06F 16/738 | (2019.01) |
| G06F 16/783 | (2019.01) |
| G06F 16/787 | (2019.01) |
| H04N 21/81 | (2011.01) |

(52) U.S. Cl.
CPC ..... *H04N 21/4316* (2013.01); *H04N 21/4622* (2013.01); *H04N 21/47* (2013.01); *H04N 21/812* (2013.01)

(58) Field of Classification Search
CPC .................................................. H04N 21/4316
See application file for complete search history.

(56) References Cited

U.S. PATENT DOCUMENTS

| | | | |
|---|---|---|---|
| 2010/0251304 A1* | 9/2010 | Donoghue | ........... H04N 21/482 |
| | | | 725/46 |
| 2016/0048588 A1* | 2/2016 | Jin | ..................... H04N 21/4828 |
| | | | 707/722 |

(Continued)

FOREIGN PATENT DOCUMENTS

| | | |
|---|---|---|
| CN | 109819284 A | 5/2019 |
| CN | 110121093 A | 8/2019 |
| CN | 110225387 A | 9/2019 |

OTHER PUBLICATIONS

First office action of Chinese application No. 201910926356.0 dated Jun. 4, 2020.

(Continued)

*Primary Examiner* — Hsiungfei Peng
(74) *Attorney, Agent, or Firm* — Knobbe, Martens, Olson & Bear, LLP

(57) ABSTRACT

A method for playing a video includes: detecting, on a display page of a target video, a first operation on the target video; generating a trigger signal in response to the first operation; acquiring, based on the trigger signal, at least one associated video of the target video; and displaying the at least one associated video.

18 Claims, 11 Drawing Sheets

(56) References Cited

U.S. PATENT DOCUMENTS

2017/0195736 A1* 7/2017 Chai .................. H04N 21/4622
2019/0020853 A1* 1/2019 Segal ................. H04N 21/4223
2019/0238908 A1* 8/2019 Lu .......................... H04L 29/06

OTHER PUBLICATIONS

Second office action of Chinese application No. 201910926356.0 dated Aug. 28, 2020.

* cited by examiner

METHOD FOR DISPLAYING VIDEOS, AND STORAGE MEDIUM AND ELECTRONIC DEVICE THEREOF

CROSS-REFERENCE TO RELATED APPLICATIONS

This application claims priority of Chinese patent application No. 201910926356.0, filed on Sep. 27, 2019, in the China National Intellectual Property Administration, the disclosure of which is herein incorporated by reference in its entirety.

TECHNICAL FIELD

The present disclosure relates to the field of video technologies, and in particular, relates to a method for displaying a video, and a storage medium and an electronic device thereof.

BACKGROUND

At present, when a user watches videos by a video application, if one of them interests the user, the user needs to exit a current display page, and input a keyword in a search box to search for associated videos. Only in this way, the videos that the user prefers can be displayed to him/her on the front end.

SUMMARY

The present disclosure provides a method for displaying a video, and a storage medium and an electronic device thereof, to improve the retrieval efficiency of associated videos. The technical solutions of the present disclosure are as follows.

According to an aspect of embodiments of the present disclosure, a method for displaying a video is provided. The method includes:

detecting, on a display page of a target video, a first operation on the target video;

generating a trigger signal, in response to the first operation;

acquiring, based on the trigger signal, at least one associated video of the target video; and displaying the at least one associated video.

According to another aspect of embodiments of the present disclosure, an electronic device is provided. The electronic device includes a memory, a processor, and a computer program stored on the memory. The processor, when running the computer program, is enabled to perform the following steps:

detecting, on a display page of a target video, a first operation on the target video;

generating a trigger signal in response to the first operation;

acquiring, based on the trigger signal, at least one associated video of the target video; and displaying the at least one associated video.

According to yet another aspect of embodiments of the present disclosure, a storage medium storing a computer program thereon is provided. The computer program, when running on a processor, enables the processor to perform the following steps:

detecting, on a display page of a target video, a first operation on the target video;

generating a trigger signal in response to the first operation;

acquiring, based on the trigger signal, at least one associated video of the target video; and displaying the at least one associated video.

According to still another aspect of embodiments of the present disclosure, a computer program product including a computer program therein is provided. The computer program, when running on a processor, enables the processor to perform following steps:

detecting, on a display page of a target video, a first operation on the target video;

generating a trigger signal in response to the first operation;

acquiring, based on the trigger signal, at least one associated video of the target video; and displaying the at least one associated video.

The technical solutions according to the embodiments of the present disclosure at least achieve the following beneficial effects.

The associated videos corresponding to the target video can be acquired and displayed as long as a user performs the first operation on the target video. Compared with a solution of retrieving the associated videos by keywords in related arts, the user does not need to perform an exit operation and a retrieve operation sequentially, such that user operations are simplified, thereby reducing user operation cost, and improving the retrieval efficiency of the associated videos.

It should be understood that both the foregoing general description and the following detailed description are only explanatory and are not restrictive of the present disclosure.

BRIEF DESCRIPTION OF DRAWINGS

The accompanying drawings, which are incorporated in and constitute a part of this description, illustrate embodiments consistent with the present disclosure and, together with the description, serve to explain the principles of the present disclosure, and do not constitute an improper limitation of the present disclosure.

DESCRIPTION OF EMBODIMENTS

In order to make those skilled in the art better understand the technical solutions of the present disclosure, the technical solutions in the embodiments of the present disclosure are clearly and completely described in the following with reference to the accompanying drawings.

It should be noted that the terms "first", "second" and the like in the description and claims, as well as the above-mentioned drawings, of the present disclosure are used to distinguish similar objects, but not necessarily used to describe a specific order or precedence order. It should be understood that data used in this way are interchangeable where appropriate, such that the embodiments of the present disclosure described herein can be implemented in a sequence other than those illustrated or described herein. The implementations set forth in the following description of example embodiments do not represent all implementations consistent with the present disclosure. Instead, they are merely examples of apparatuses and methods consistent with aspects related to the present disclosure as recited in the appended claims.

Figure 1:
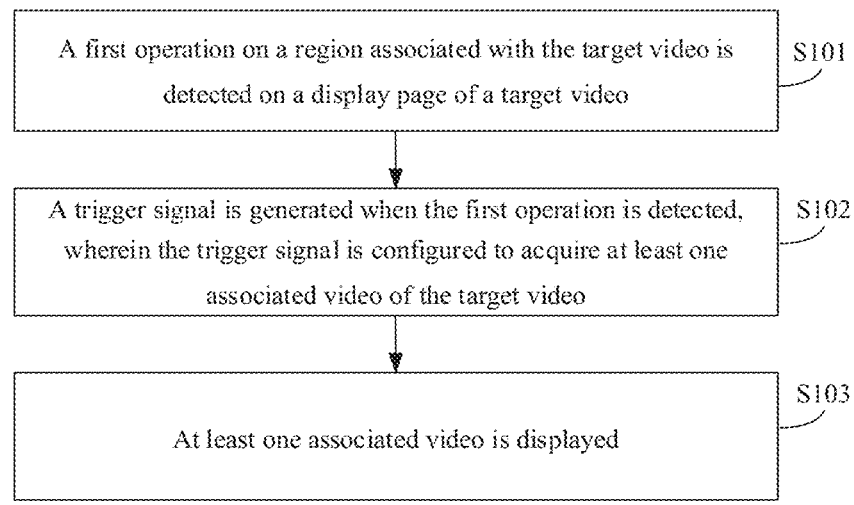
FIG. 1 is a flow chart of a method for displaying a video according to an embodiment of the present disclosure.

FIG. 1 is a flowchart of a method for displaying a video according to an embodiment of the present disclosure. As shown in FIG. 1, the method is applicable to an electronic device with a display function. The method includes the following steps.

In step S101, a first operation on a region associated with the target video is detected on a display page of a target video.

In some embodiments, the electronic device is mounted with a target application, and the first operation on the region associated with the target video is detected through a display page in the target application.

In some embodiments, the region associated with the target video is a video cover of the target video; and the first operation on the target video means that the first operation is performed on the video cover of the target video.

In another embodiment, the region associated with the target video is a region where the target video is played; and the first operation on the target video means that the first operation is performed on the video playing region of the target video.

In some embodiments, the display page of the electronic device includes a plurality of videos. When browsing the plurality of videos, a user can perform a first operation on the target video among the videos. When detecting the first operation, the electronic device considers that the target video is the video of interest to the user. The target video is any one of the plurality of videos.

In some embodiments, the display page is a cover display page configured to display a video cover of at least one video; and the at least one video includes the target video. The electronic device displays the video cover of the target video, and the user performs the first operation on the video cover of the target video.

In other embodiments, the display page is a video playing page including the target video being played. The user can perform the first operation on the target video when watching the target video; and when detecting the first operation, the electronic device considers that the target video is the video of interest to the user.

In some embodiments, the video playing page includes a video playing window and other regions such as a comment display region and a video list display region. In this case, the electronic device plays the target video in the video playing window of the video playing page, and the user performs the first operation on the target video in the video playing window.

In some embodiments, the first operation is a long-press operation, a double-tap or double-click operation, a swipe operation in a preset direction, a screenshot operation, or the like, which are not limited in the embodiments of the present disclosure.

In step S102, a trigger signal is generated when the first operation is detected, wherein the trigger signal is configured to acquire at least one associated video of the target video.

In response to detecting the first operation, the electronic device generates the trigger signal, so as to acquire the at least one associated video of the target video on the basis of the trigger signal.

In some embodiments, if the display page is the cover display page, the trigger signal is generated while the first operation on the video cover of the target video is detected. That is, the electronic device generates the trigger signal in response to the first operation on the video cover of the target video.

The first operation is a long-press operation, a double-click or double-tap operation, a swiping operation in a preset direction, or the like.

Figure 2:
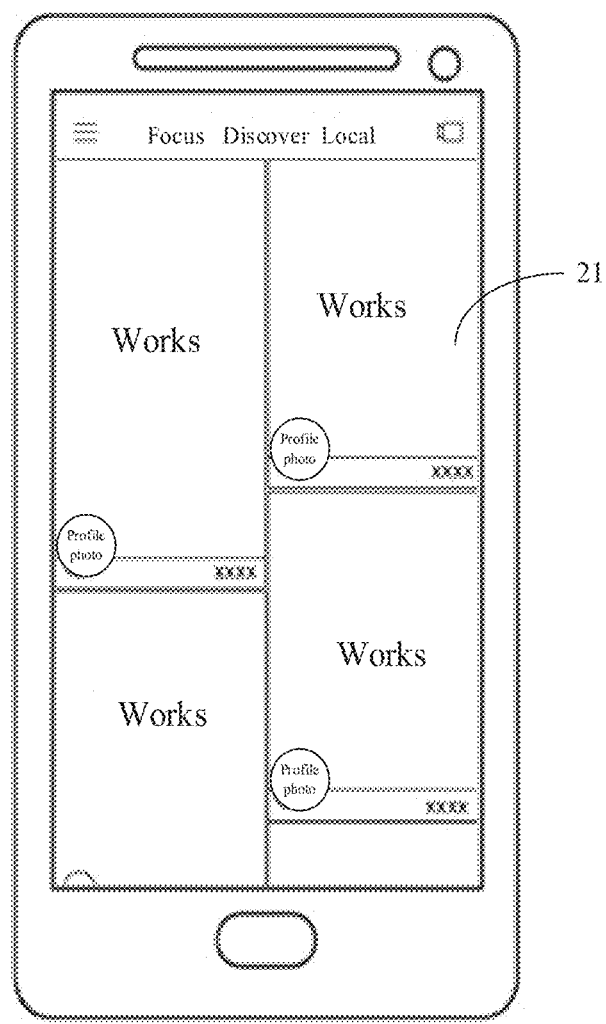
FIG. 2 is a schematic diagram of a display page according to an embodiment of the present disclosure.
Figure 3:
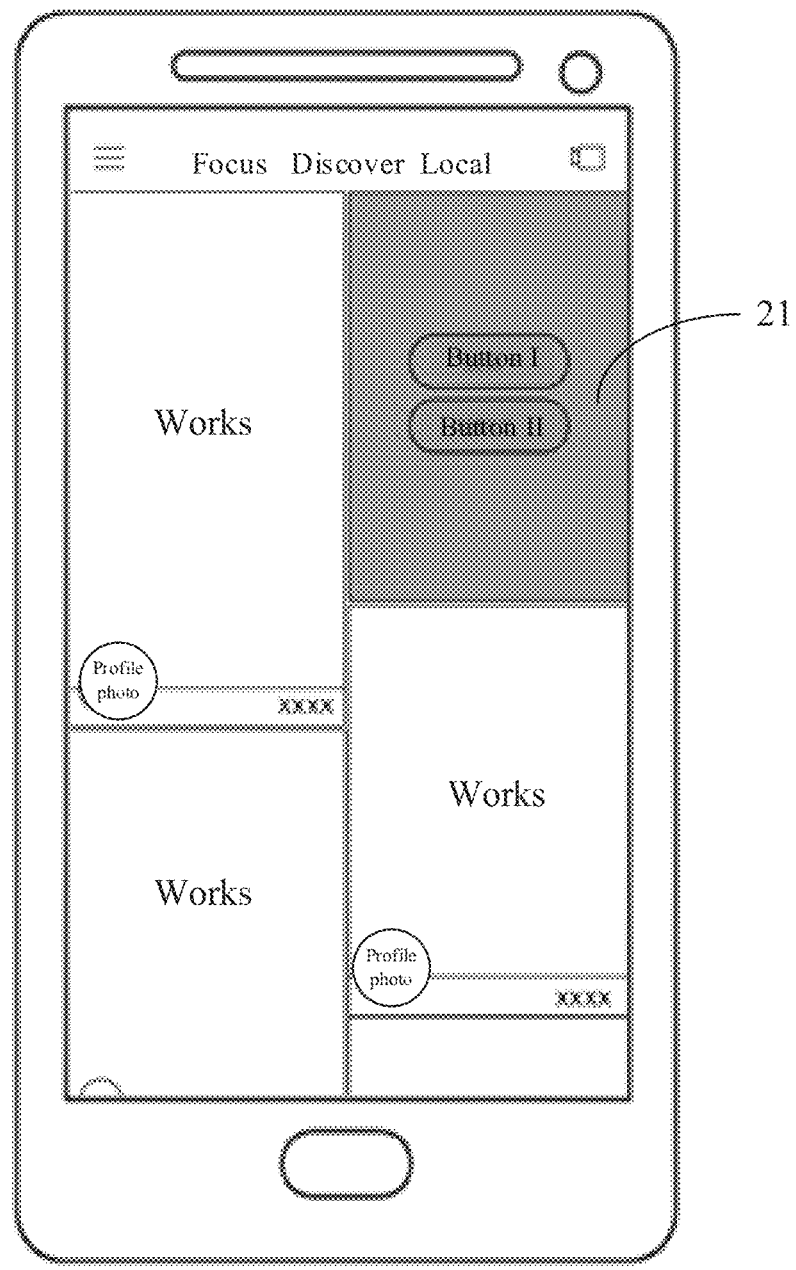
FIG. 3 is a schematic diagram of a principle of triggering retrieval of associated videos according to an embodiment of the present disclosure.

For example, as shown in FIG. 2, when finding a video cover 21 of interest on the cover display page, the user long presses the video cover 21. After the electronic device detects the long press operation on the video cover 21, as shown in FIG. 3, two buttons are provided on the video cover 21, namely, button I (such as "reduce the number of similar works") and button II (such as "view similar works"). The trigger signal can be generated as long as the user clicks or taps button II. After that, videos associated with the video to which the video cover 21 belongs can be retrieved on the basis of the trigger signal.

In other embodiments, if the display page is the video playing page, the video playing page includes the target video being played, and the trigger signal is generated when the first operation on the target video is detected. That is, the electronic device generates the trigger signal in response to the first operation on the target video.

In some embodiments, if the video playing page includes the video playing window, the video playing window includes the target video being played, and the electronic device generates the trigger signal in response to the first operation on the video playing window. That is, the electronic device generates the trigger signal in response to a first operation on a target video being played.

The first operation is a long-press operation, a double-click or double-tap operation, a swiping operation in a preset direction, a screenshot operation, or the like.

For example, when finding a video of interest in the video playing window of the video playing page, the user double taps or clicks the video. The electronic device detects the double-click or double-tap operation, and generates the trigger signal in response to the double-click or double-tap operation.

For another example, when finding a video of interest in the video playing window of the video playing page, the user takes a screenshot of the video. The electronic device detects the screenshot operation, and generates the trigger signal in response to the screenshot operation.

In this embodiment, the associated video of the target video is a video having the similar content as the target video, or a video the same as the target video in at least one of the following: a video author, a video publication location, or a video theme.

In this embodiment, the associated video is retrieved through a local device or a server, which is not limited in the embodiments of the present disclosure. The associated video retrieved by the local device is a video cached by the local device, or a video shot by the local device.

In some embodiments, if the associated video is retrieved by the server, the retrieve process is as follows. The terminal sends a video acquisition request to the server, the video acquisition request carrying a video identifier of the target video; the server detects which associated videos meet a preset condition according to the video acquisition request, and sends associated videos that meet the preset condition to the terminal; and the terminal obtains the associated videos. The preset conditions include at least one of the following: similar video content, the same video author, the same video publication location, and the same video theme.

In step S103, at least one associated video is displayed.

In some embodiments, when the associated video is displayed, the associated video of the target video occupies the entire display page. For example, the display page skips to a new page, and the at least one associated video is displayed on the new page.

In other embodiments, when the associated video is displayed, the associated video only occupies part of the display page. For example, the associated video is displayed on the display page of the target video in a floating layer fashion or in a fashion of embedding the display page.

In related arts, in order to acquire an associated video, the user needs to exit from the current display page to retrieve the associated video by searching a keyword. As a result, the user operation cost is increased, and the retrieval efficiency of the associated video is lower.

In the embodiment of the present disclosure, the associated video corresponding to the target video can be acquired and displayed as long as the user performs the first operation on the target video. Compared with a solution of retrieving the associated video by the keyword in the related arts, the user does not need to perform an exit operation and a retrieval operation sequentially, such that user operations are simplified, thereby reducing the user operation cost, and improving the retrieval efficiency of the associated video.

In some embodiments, the retrieve step of the associated video includes recalling and ranking. Recalling refers to acquiring at least one associated video. Ranking refers to ranking the acquired at least one associated video, such that the at least one associated video can be displayed according to the ranking. In some embodiments, the following algorithms are adopted to obtain the at least one associated video: a content-based recommendation algorithm, a collaborative filtering recommendation algorithm, a combined recommendation algorithm, etc.

The content-based recommendation algorithm recommends content similar to the content that the user used to like to the user according to his/her preference in the past, wherein the content-based recommendation algorithm calculates a similarity between items by using content attributes of the items, and determines the associated video of the target video according to the similarity between the items.

The collaborative filtering recommendation algorithm includes user-based collaborative filtering, item-based collaborative filtering (ItemCF), and model-based collaborative filtering (such as matrix decomposition). The ItemCF algorithm calculates a similarity between items by analyzing user behavior data (such as the number of videos clicked or tapped, watched, forwarded, and commented by the user), and determines the associated video of the target video according to the similarity between the items.

The combined recommendation algorithm combines multiple recommendation algorithms for video recommendation.

In some embodiments, acquiring the at least one associated video of the target video in step S102 includes:

acquiring the at least one associated video of the target video through the content-based recommendation algorithm; and ranking the at least one associated video of the target video according to a user behavior log to acquire a target video recommendation list.

Displaying the at least one associated video includes: displaying at least one associated video in the target video recommendation list.

The target recommendation list includes the at least one ranked associated video after ranking.

In some embodiments, the electronic device acquires the at least one associated video on the basis of the trigger signal by using the content-based recommendation algorithm. Before recommending the associated video to the user, the electronic device identifies a video cover of the target video or at least one video key frame in the target video to obtain video content of the target video. After that, the electronic device acquires video content of other videos, determines a similarity between the video content of the target video and the video content of the other videos, and determines the associated video of the target video according to the size of the similarity.

In some embodiments, the electronic device determines a video with a similarity greater than a preset similarity as the associated video of the target video.

In some embodiments, the electronic device acquires a target video recommendation list by ranking at least one associated video according to the similarity between each associated video and the target video. In the target video recommendation list, associated videos with high similarities are arranged in front, such that the user can watch the associated videos with the greater similarities first.

In other embodiments, the electronic device acquires a target video recommendation list by ranking at least one associated video according to the user behavior log. For example, the electronic device ranks the at least one associated video according to the viewing number of the at least one associated video, and arranges the video with a larger viewing number in front. The user behavior log records the number of clicks or taps, likes, forwards, comments, and the like performed by the users on the videos.

For example, the electronic device generates a content vector on the basis of information of the target video such as the video cover and the video key frame, inputs the content vector to a deep learning model, and processes the content vector through the deep learning model to obtain at least one associated video of the target video.

In some embodiments, acquiring the at least one associated video of the target video in step S102 includes:

acquiring the at least one associated video of the target video by using the collaborative filtering recommendation algorithm; and acquiring a target video recommendation list by ranking the at least one associated video of the target video according to a user behavior log.

In some embodiments, the electronic device acquires the at least one associated video of the target video by using the item-based collaborative filtering algorithm (ItemCF). The electronic device acquires user behavior data of a plurality of users including the target user. The user behavior data includes the videos clicked or tapped, watched, forwarded, liked, and commented by each user, as well as the number of comments on each video, and the like. The user behavior data of the plurality of users is processed on the basis of the item-based collaborative filtering algorithm to acquire the associated video of the target video.

In some embodiments, the electronic device acquires at least one associated video of the target video by using the model-based collaborative filtering algorithm.

In other embodiments, the electronic device generates a behavior vector on the basis of the user behavior data, inputs the behavior vector to a deep learning model, and processes the behavior vector by the deep learning model to acquire at least one associated video of the target video.

For example, on the basis of information of the user such as click or tap, watch, forwarding, and comment on the videos, a user's preference degree for each of the videos is calculated; a rating matrix is constructed; an ALS (crossed least squares) matrix decomposition algorithm is adopted to obtain the behavior vector; and a K-nearest neighbor is used to retrieve at least one associated video of the target video.

In other embodiments, the electronic device acquires the at least one associated video by using the combined recommendation algorithm. For example, based on the content-based recommendation algorithm and the collaborative filtering recommendation algorithm, the at least one associated video of the target video is acquired. That is, the above two algorithms are combined to obtain at least the one associated video of the target video. After acquiring the associated videos by using the two algorithms respectively, the electronic device recommends the same video among the videos recommended by the two algorithms to the user as the associated videos, or recommends the all videos recommended by the two algorithms to the user.

In the related arts, when retrieving for associated videos by searching with a keyword, the keyword input by the user in the search box may have, for example, inaccuracy and low matching with the video of interest, resulting in low retrieving accuracy of the associated videos.

In the embodiment of the present disclosure, the first operation may be directly performed on the target video to acquire the associated video of the target video, such that the user does not need to determine the keyword corresponding to the target video to obtain the associated video according to the keyword, thereby avoiding low matching between the acquired associated video and the target video caused by the inaccurate keyword determined by the user. Therefore, the accuracy of the acquired associated video is improved, and it is ensured that the user is interested to the acquired associated video.

In some embodiments, in order to further improve the video retrieval accuracy, acquiring the target video recommendation list by ranking the at least one associated video of the target video according to the user behavior log includes:

acquiring an initial video recommendation list by ranking the at least one associated video of the target video according to the user behavior log; and acquiring the target video recommendation list by adjusting the initial video recommendation list according to an adjustment policy.

The adjustment policy includes at least one of: an operation policy or a filtering policy. The operation policy includes: topping priority videos in a short term. The filtering policy includes: filtering videos that the user had watched, browsed, recommended, disliked, or videos that have at least one of negative tags (such as sensitive content and reported content).

In some embodiments, displaying the at least one associated video in step S103 includes:

displaying the at least one associated video on the display page, or displaying the at least one associated video and an original video in the display page on the same page, wherein the original video refers to the video that had been displayed on the display page before the associated video is displayed, and the original video includes the target video.

When displaying the at least one associated video and the original video in the display page on the same page, the at least one associated video is displayed in a floating layer fashion. That is, the at least one associated video is displayed in a floating layer of the display page. Alternatively, the at least one associated video is displayed in an embedded fashion. That is, the at least one associated video is displayed on the display page in a fashion of embedding the display page.

Figure 4A:
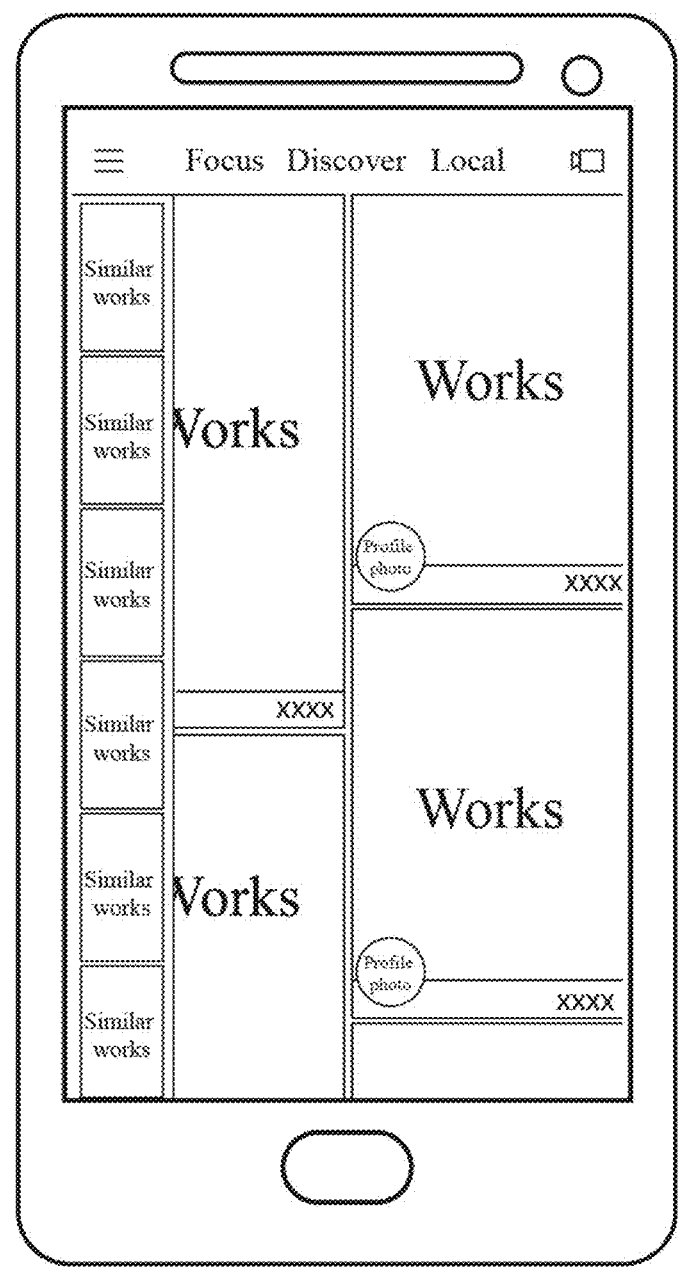
FIG. 4a is a schematic diagram of a display page of the associated videos according to an embodiment of the present disclosure.

In some embodiments, as shown in FIG. 4a, the at least one associated video (i.e., a similar work) of the target video is displayed in a floating layer fashion. The floating layer is a side floating layer, and has a width less than that a video cover of the original video on the display page.

Figure 4B:
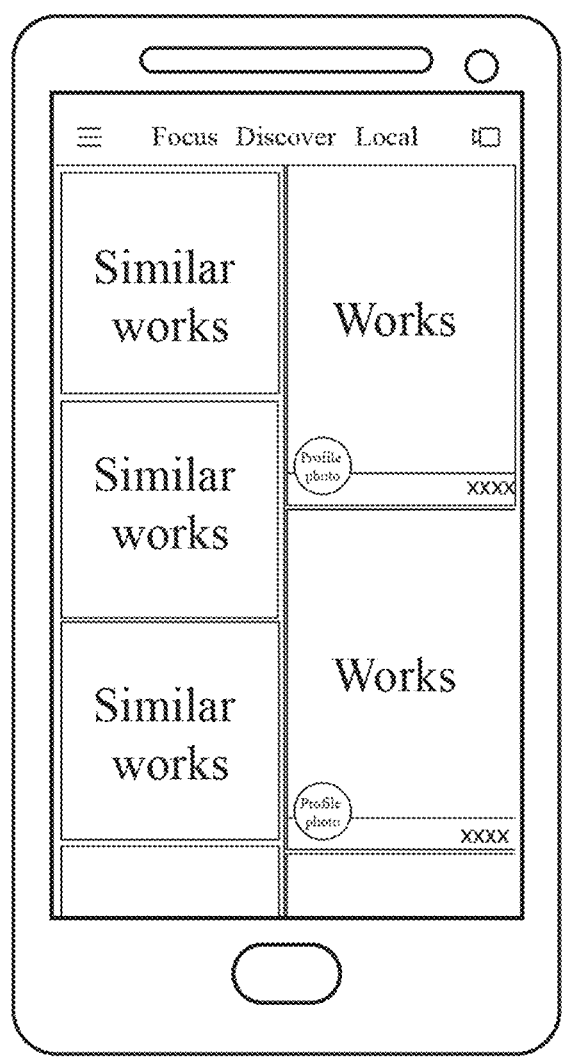
FIG. 4b is a schematic diagram of another display page of the associated videos according to an embodiment of the present disclosure.

In other embodiments, as shown in FIG. 4b, the at least one associated video of the target video is displayed in the floating layer fashion. The floating layer is the side floating layer, and has a width equal to that the video cover of the original video on the display page.

Figure 4C:
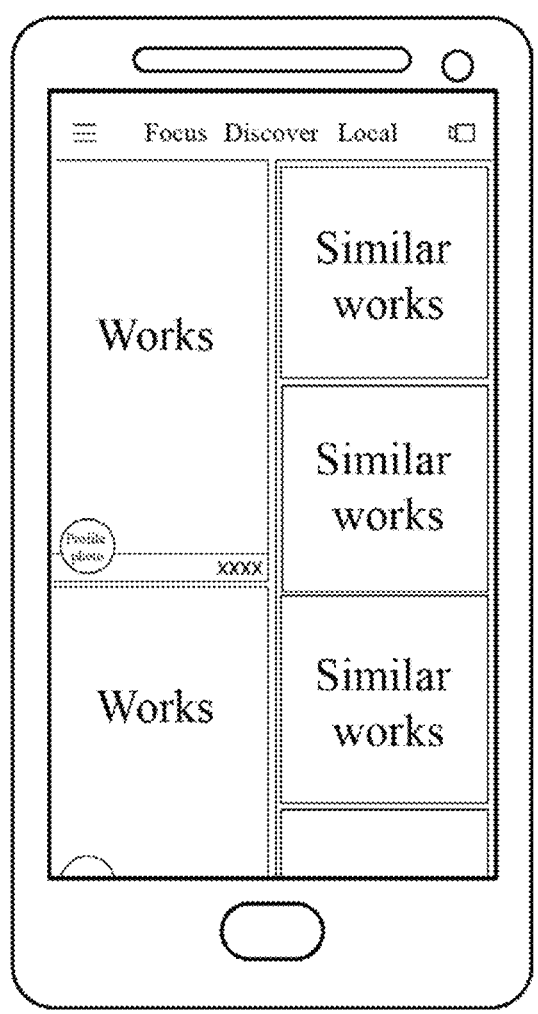
FIG. 4c is a schematic diagram of yet another display page of the associated videos according to an embodiment of the present disclosure.

It should be noted that the floating layer in FIGS. 4a and 4b is floated on the left side. The floating layer may also be floated on the right side (as shown in FIG. 4c), or the floating layer may be floated in the middle of the page. The floating position is not limited in the embodiments of the present disclosure.

Figure 4D:
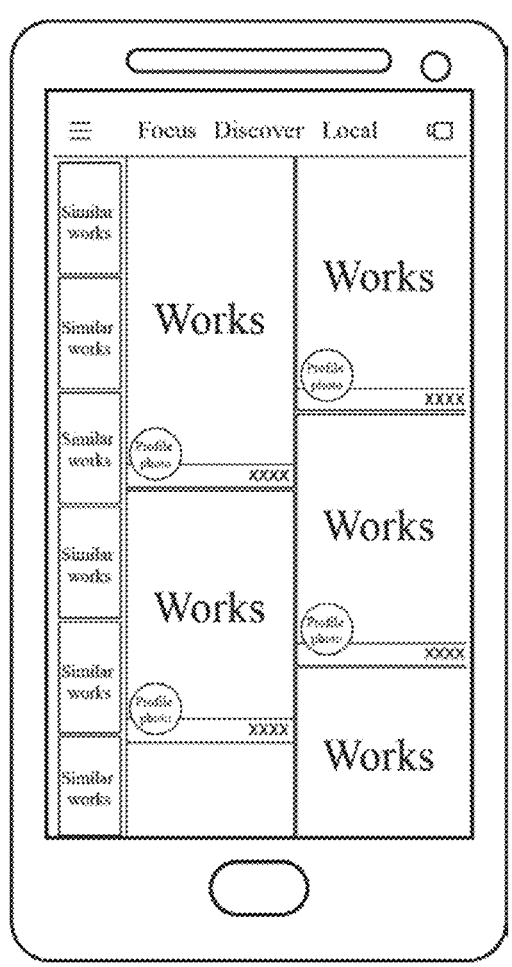
FIG. 4d is a schematic diagram of still another display page of the associated videos according to an embodiment of the present disclosure.
Figure 4E:
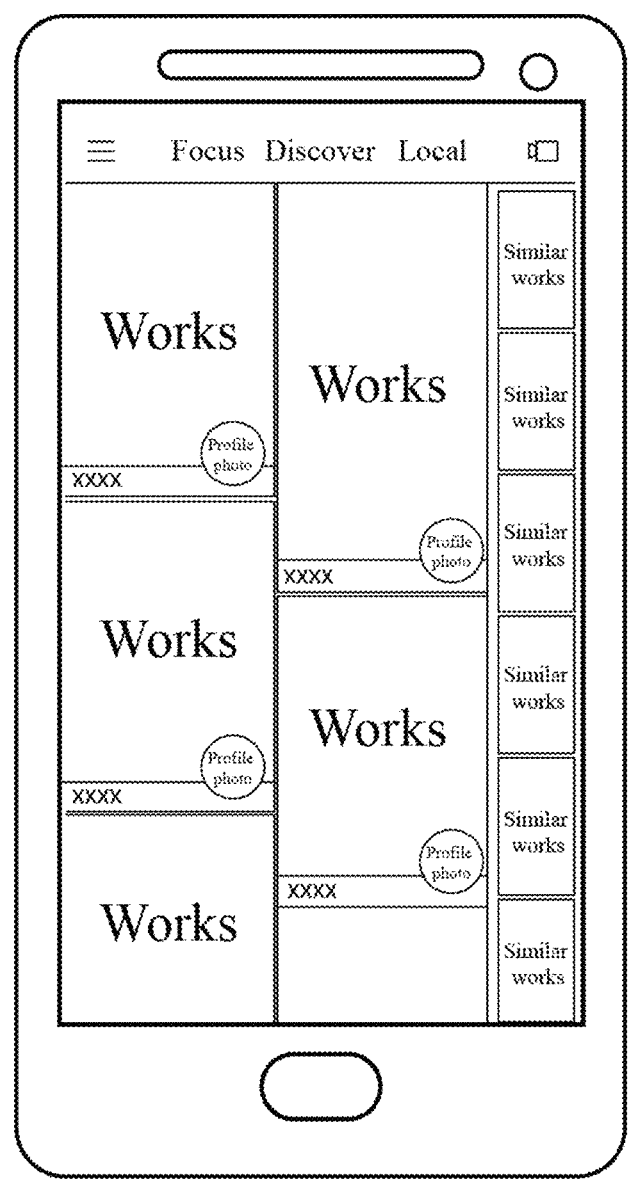
FIG. 4e is a schematic diagram of further another display page of the associated videos according to an embodiment of the present disclosure.

In other embodiments, as shown in FIGS. 4d and 4e, the at least one associated video of the target video is displayed in an embedded fashion. The size of the video cover of the original video on the display page is correspondingly reduced. That is, the size of the video cover of the original video is reduced to enable the video cover of the at least one associated video and the complete video cover of the original video to be simultaneously displayed on the display page.

Figure 4F:
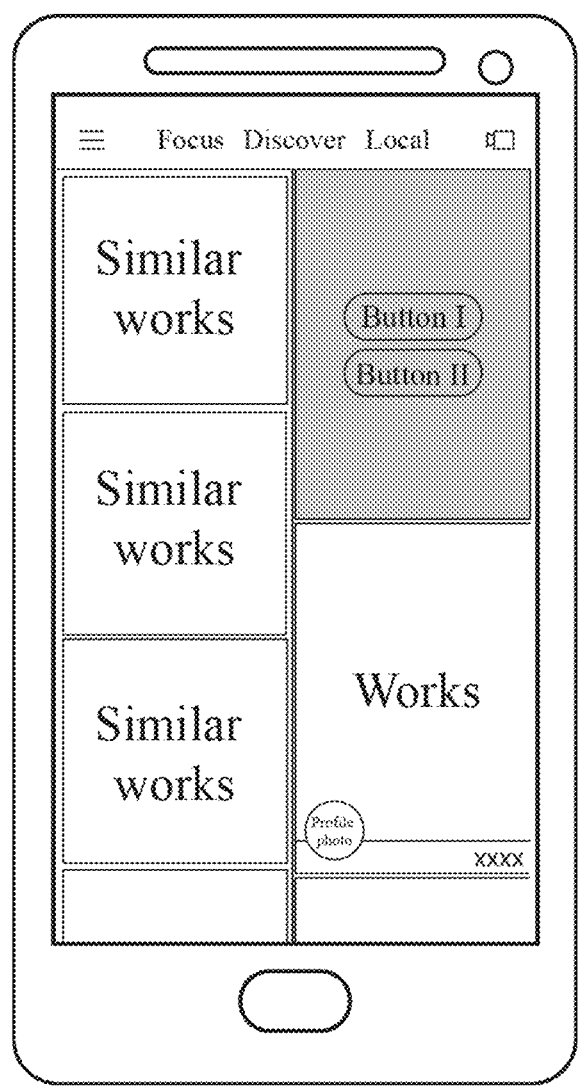
FIG. 4f is a schematic diagram of still yet another display page of the associated videos according to an embodiment of the present disclosure.

In some embodiments, as shown in FIG. 4f, when the at least one associated video and the original video in the display page are displayed on the same page, two buttons on the video cover of the target video can still be retained.

In this solution, the at least one associated video and the original video in the display page are displayed on the same page in a floating layer fashion or an embedded fashion. As the associated video and the original video are both displayed on the display page, the user can browse the original video without any influence, thereby improving the user experience.

In other embodiments, when the electronic device displays the at least one associated video, the display page skips to a new page, and the at least one associated video is displayed on the new page. At this time, the new page only includes the at least one associated video, without the original video on the display page.

In other embodiments, if the display page is a video playing page, after acquiring the at least one associated video of the target video, the electronic device displays the at least one associated video on the new page, or displays the at least one associated video and the target video being played on the video playing page.

If the video playing page is in a full-screen state, the video playing page only includes the target video. At this time, a floating layer is displayed on the upper layer of the target video, and the at least one associated video is displayed in the floating layer. The floating layer is located on the left side, right side, lower side, or other locations of the video playing page. In addition, the target video is in a playing or paused state during displaying the associated video. If the video playing page is not in the full-screen state, but is displayed in a video playing window, the at least one associated video is displayed in a video list display region of the video playing page.

In some embodiments, as the number of associated videos displayed on the display page is fixed, if the user wants to view other associated videos, it is required to replace a currently displayed associated video. Thus, the method further includes:

detecting a video replacement request of the associated video; and replacing, according to the video replacement request, the currently displayed associated video of the target video.

In this embodiment, the associated video replacement request is generated by the user swiping the associated video; or the electronic device provides the user with an associated video replacement button, and the user clicks or taps the associated video replacement button to generate the associated video replacement request, which is not limited in the embodiments of the present disclosure.

In some embodiments, detecting the video replacement request of the associated video includes:

determining that the video replacement request of the associated video is detected when a swiping operation performed by the user in a video region of the associated video is detected; or determining that the video replacement request of the associated video is detected when it is detected that the associated video replacement button is clicked or tapped.

In some embodiments, when the user has no need for the associated video, for example, an instruction to view the associated video has not been received beyond a preset time, the method further includes:

detecting a display cancellation indication of the associated video; and cancelling the at least one associated video according to the display cancellation indication.

In some embodiments, when displaying the at least one associated video on the display page (for example, displaying the at least one associated video in a floating layer fashion or an embedded fashion), detecting the display cancellation indication of the associated video includes the following step.

When a click or tap signal on a region outside a target region is received, it is determined that the display cancellation indication of the associated video is detected. That is, the display cancellation indication is generated in response to the click or tap signal on the region outside the target region. The target region is a region corresponding to the at least one associated video in the display page. For example, if the electronic device displays the at least one associated video in a floating layer fashion, the target region is a region outside the floating layer.

In other embodiments, when displaying the at least one associated video on the display page (for example, displaying the at least one associated video in a floating layer fashion or an embedded fashion), detecting the display cancellation indication of the associated video includes:

when a click or tap signal on a masking layer is received, determining that the display cancellation indication of the associated video is detected, namely, the display cancellation indication being generated in response to the click or tap signal on the masking layer, wherein the masking layer is set on a region outside a region corresponding to the target region.

For example, when displaying the at least one associated video, the masking layer is created on the region outside the target region in the display page. For example, the created mask is a black semitransparent masking layer. When the user has no need for the associated video, the user clicks or taps the masking layer. The electronic device determines that the display cancellation indication of the associated video is detected when detecting the click or tap operation on the masking layer, and cancels the display of the at least one associated video according to the display cancellation indication.

In another embodiment, if the at least one associated video is displayed in an embedded fashion, the method further includes: reducing a size of a video cover of an original video in the display page of the target video.

After cancelling the display of the at least one associated video, the method further includes: restoring the size of the video cover of the original video in the display page of the target video to its original size.

For example, when a click or tap signal on a region outside the target region on the display page is received, it is determined that the display cancellation indication of the associated video is detected; the display of the at least one associated video is canceled according to the display cancellation indication; and the size of the video cover of the original video in the display page of the target video is restored to its original size.

In another embodiment, if the at least one associated video is displayed on the new page including a close button, the display of the at least one associated video can be cancelled as long as the user directly clicks or taps the close button.

Figure 5:
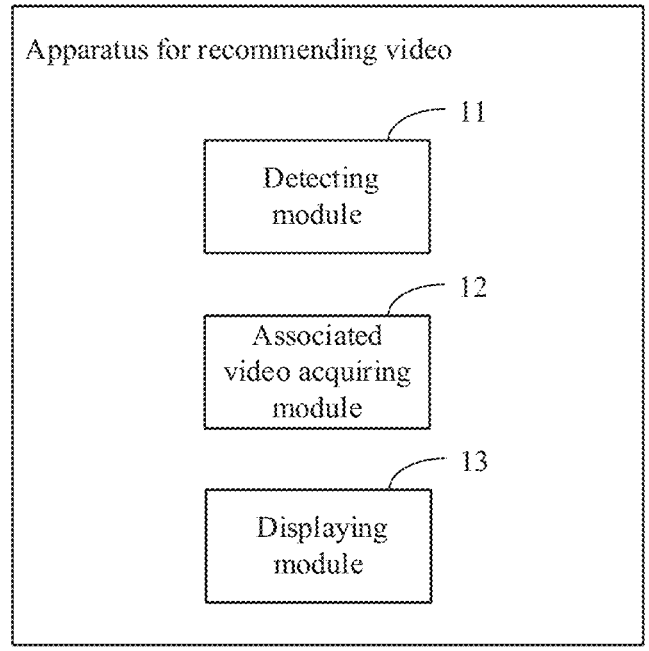
FIG. 5 is a schematic structural diagram of an apparatus for recommending a video according to an embodiment of the present disclosure.

Based on a similar inventive concept, the embodiments of the present disclosure further provide a video recommendation apparatus. FIG. 5 is a schematic structural diagram of an apparatus for recommending a video according to an embodiment of the present disclosure. Referring to FIG. 5, the apparatus includes: a first detecting module 11, an associated video acquiring module 12, and a displaying module 13.

The first detecting module 11 is configured to, detect, on a display page of a target video, a first operation on the target video.

The associated video acquiring module 12 is configured to generate a trigger signal in response to the first operation.

The associated video acquiring module 12 is further configured to, acquire, based on the trigger signal, at least one associated video of the target video.

The displaying module 13 is configured to display the at least one associated video.

In some embodiments, the associated video acquiring module 12 is configured to:

generate the trigger signal in response to a first operation on a video cover of the target video, wherein the display page is a cover display page, the cover display page being configured to display a video cover of at least one video, the at least one video comprising the target video; or generate the trigger signal in response to the first operation on a target video being played, wherein the display page is a video playing page, and the video playing page comprises the target video being played In some embodiments, the displaying module 13 is configured to:

display at least one associated video on a display page; or enable the display page to skip to a new page, and display the at least one associated video on the new page.

In some embodiments, the displaying module 13 is configured to:

display the at least one associated video in a floating layer of the display page; or display the least one associated video on the display page in a fashion of embedding the display page.

Figure 6:
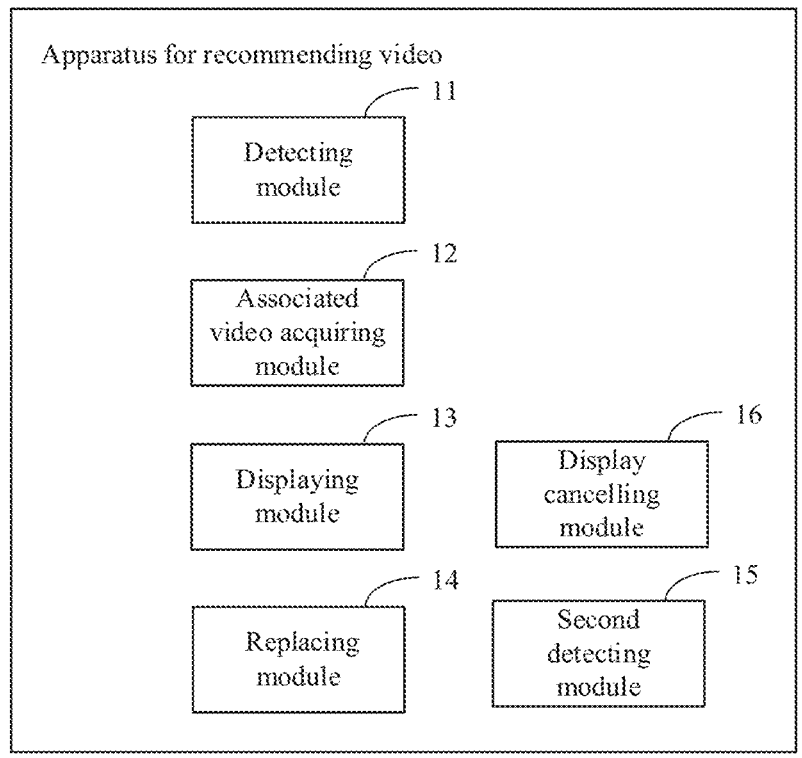
FIG. 6 is a schematic structural diagram of another apparatus for recommending a video according to an embodiment of the present disclosure.

In some embodiments, as shown in FIG. 6, the apparatus further includes:

a replacing module 14, configured to detect a video replacement request of the associated video, and replace a currently displayed associated video of the target video according to the video replacement request.

In some embodiments, as shown in FIG. 6, the apparatus further includes:

a second detecting module 15, configured to detect a display cancellation indication of the at least one associated video; and a display cancelling module 16, configured to cancel the display of the at least one associated video according to the display cancellation indication.

In some embodiments, the display cancellation indication is generated in response to a click or tap signal on a region outside a target region; and the target region is a region corresponding to the at least one associated video in the display page.

In some embodiments, the display cancellation indication is generated in response to a click or tap signal on a masking layer which is set on the upper layer of a region outside a target region; and the target region is a region corresponding to the at least one associated video in the display page.

In some embodiments, the apparatus is further configured to:

create the masking layer on the upper layer of the region outside the target region when the at least one associated video is displayed.

Figure 7:
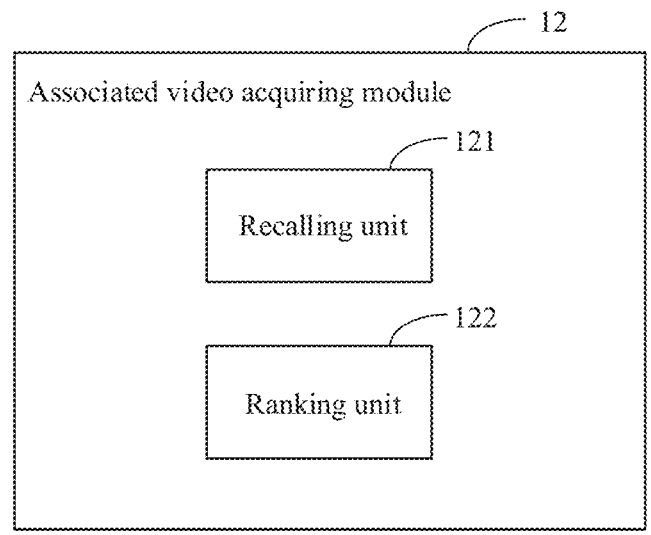
FIG. 7 is a schematic structural diagram of an associated video acquiring module in an apparatus for recommending a video according to an embodiment of the present disclosure.

In some embodiments, as shown in FIG. 7, the associated video acquiring module 12 includes a recalling unit 121 and a ranking unit 122.

The recalling unit 121 is configured to acquire a target video recommendation list which includes at least one associated video after ranking.

The above displaying module 13 is further configured to display the at least one associated video in the target video recommendation list.

Figure 8:
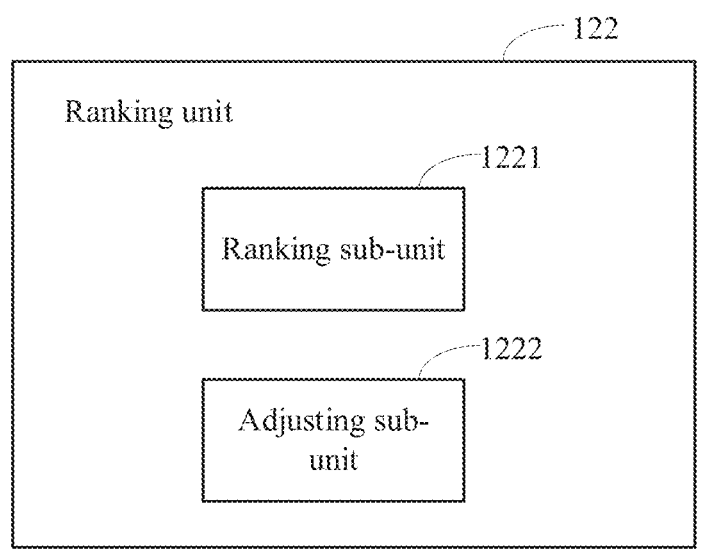
FIG. 8 is a schematic structural diagram of a ranking module in an apparatus for recommending a video according to an embodiment of the present disclosure.

In some embodiments, as shown in FIGS. 7 and 8, the ranking unit 122 includes:

a ranking sub-unit 1221, configured to acquire an initial video recommendation list by ranking the at least one associated video of the target video; and an adjusting sub-unit 1222, configured to acquire the target video recommendation list by adjusting the initial video recommendation list according to an adjustment policy.

In some embodiments, as shown in FIG. 8, the ranking sub-unit 1221 is configured to:

acquire the target video recommendation list by ranking the at least one associated video according to a user behavior log; or acquire the target video recommendation list by ranking the at least one associated video according to a similarity of each associated video.

In some embodiments, as shown in FIG. 7, the recalling unit 121 is configured to:

acquire the at least one associated video on the basis of the trigger signal by using a content-based recommendation algorithm; or acquire the at least one associated video on the basis of the trigger signal by using a collaborative filtering recommendation algorithm.

For implementation processes of functions and roles of each module in the above apparatus, refer to the implementation processes of the corresponding steps in the above method for details, which are not be repeated herein.

For the apparatus embodiments, as they may correspond to the method embodiments, the related parts may refer to the descriptions for the method embodiments. The above apparatus embodiments are illustrative only. The modules described as separate members may be or may not be physically separated. The members described as modules may be or may not be physical units, may be located at the same place or may be distributed in multiple network units. According to actual needs, part of or all of the modules can be selected to achieve purposes of the embodiments of the present disclosure. It can be readily understood and carried out by those skilled in the art.

Based on a similar inventive concept, an embodiment of the present disclosure further provides a storage medium storing a computer program thereon. The computer program, when running on a processor, enables the processor to perform the following steps:

detecting, on a display page of a target video, a first operation on the target video;

generating a trigger signal in response to the first operation;

acquiring, based on the trigger signal, at least one associated video of the target video; and displaying the at least one associated video.

In some embodiments, the computer program, when running on a processor, enables the processor to perform the following step:

generating the trigger signal in response to a first operation on a video cover of the target video, wherein the display page is a cover display page, the cover display page being configured to display a video cover of at least one video, the at least one video comprising the target video; or generating the trigger signal in response to the first operation on a target video being played, wherein the display page is a video playing page, and the video playing page comprises the target video being played.

In some embodiments, the computer program, when running on a processor, enables the processor to perform the following step:

displaying at least one associated video on the display page; or skipping from the display page to a new page, and displaying the at least one associated video on the new page.

In some embodiments, the computer program, when running on a processor, enables the processor to perform the following step:

displaying the at least one associated video in a floating layer of the display page; or displaying the least one associated video on the display page in a fashion of embedding the display page.

In some embodiments, the computer program, when running on a processor, enables the processor to perform the following steps:

detecting a display cancellation indication of the at least one associated video; and cancelling the display of the at least one associated video according to the display cancellation indication.

In some embodiments, the display cancellation indication is generated in response to a click or tap signal on a region outside a target region; and the target region is a region corresponding to the at least one associated video in the display page.

In some embodiments, the display cancellation indication is generated in response to a click or tap signal on a masking layer which is set on the upper layer of a region outside a target region; and the target region is a region corresponding to the at least one associated video in the display page.

In some embodiments, the computer program, when running on a processor, enables the processor to perform the following step:

creating the masking layer on the upper layer of the region outside the target region when the at least one associated video is displayed.

In some embodiments, the computer program, when running on a processor, enables the processor to perform the following steps:

acquiring a target video recommendation list which includes at least one associated video after ranking; and displaying the at least one associated video in the target video recommendation list.

In some embodiments, the computer program, when running on a processor, enables the processor to perform the following steps:

acquiring an initial video recommendation list by ranking the at least one associated video of the target video; and acquiring the target video recommendation list by adjusting the initial video recommendation list according to an adjustment policy.

In some embodiments, the computer program, when running on a processor, enables the processor to perform the following step:

acquiring the target video recommendation list by ranking the at least one associated video according to a user behavior log; or acquiring the target video recommendation list by ranking the at least one associated video according to a similarity of each associated video.

In some embodiments, the computer program, when running on a processor, enables the processor to perform the following step:

acquiring the at least one associated video on the basis of the trigger signal by using a content-based recommendation algorithm; or acquiring the at least one associated video on the basis of the trigger signal by using a collaborative filtering recommendation algorithm.

Optionally, the storage medium is a non-transitory computer-readable storage medium. For example, the non-transitory computer-readable storage medium may be a ROM, a RAM, a CD-ROM, a magnetic tape, a floppy disc, an optical data storage device, or the like.

Based on a similar inventive concept, an embodiment of the present disclosure further provides a computer program product including a computer program. The computer program, when running on a processor, enables the processor to perform the following steps:

detecting, on a display page of a target video, a first operation on the target video;

generating a trigger signal in response to the first operation;

acquiring, based on the trigger signal, at least one associated video of the target video; and displaying the at least one associated video.

In some embodiments, the computer program, when running on a processor, enables the processor to perform the following step:

generating the trigger signal in response to a first operation on a video cover of the target video, wherein the display page is a cover display page, the cover display page being configured to display a video cover of at least one video, the at least one video comprising the target video; or generating the trigger signal in response to the first operation on a target video being played, wherein the display page is a video playing page, and the video playing page comprises the target video being played.

In some embodiments, the computer program, when running on a processor, enables the processor to perform the following step:

displaying at least one associated video on the display page; or skipping from the display page to a new page, and displaying the at least one associated video on the new page.

In some embodiments, the computer program, when running on a processor, enables the processor to perform the following step:

displaying the at least one associated video in a floating layer of the display page; or displaying the least one associated video on the display page in a fashion of embedding the display page.

In some embodiments, the computer program, when running on a processor, enables the processor to perform the following steps:

detecting a display cancellation indication of the at least one associated video; and cancelling the display of the at least one associated video according to the display cancellation indication.

In some embodiments, the display cancellation indication is generated in response to a click or tap signal on a region outside a target region; and the target region is a region corresponding to the at least one associated video in the display page.

In some embodiments, the display cancellation indication is generated in response to a click or tap signal on a masking layer which is set on the upper layer of a region outside a target region; and the target region is a region corresponding to the at least one associated video in the display page.

In some embodiments, the computer program, when running on a processor, enables the processor to perform the following step:

creating the masking layer on the upper layer of the region outside the target region when the at least one associated video is displayed.

In some embodiments, the computer program, when running on a processor, enables the processor to perform the following steps:

acquiring a target video recommendation list which includes at least one associated video after ranking; and displaying the at least one associated video in the target video recommendation list.

In some embodiments, the computer program, when running on a processor, enables the processor to perform the following steps:

acquiring an initial video recommendation list by ranking the at least one associated video of the target video; and acquiring the target video recommendation list by adjusting the initial video recommendation list according to an adjustment policy.

In some embodiments, the computer program, when running on a processor, enables the processor to perform the following step:

acquiring the target video recommendation list by ranking the at least one associated video according to a user behavior log; or acquiring the target video recommendation list by ranking the at least one associated video according to a similarity of each associated video.

In some embodiments, the computer program, when running on a processor, enables the processor to perform the following step:

acquiring the at least one associated video on the basis of the trigger signal by using a content-based recommendation algorithm; or acquiring the at least one associated video on the basis of the trigger signal by using a collaborative filtering recommendation algorithm.

Based on a similar inventive concept, an embodiment of the present disclosure further provides an electronic device. The electronic device includes a memory, a processor, and a computer program stored on the memory.

The processor, when running the computer program, is enabled to perform the following steps:

detecting on a display page of a target video, a first operation on the target video;

generating a trigger signal in response to the first operation; and acquiring, based on the trigger signal, at least one associated video of the target video; and displaying the at least one associated video.

In some embodiments, the processor, when running the computer program, is enabled to perform the following step:

generating the trigger signal in response to a first operation on a video cover of the target video, wherein the display page is a cover display page, the cover display page being configured to display a video cover of at least one video, the at least one video comprising the target video; or generating the trigger signal in response to the first operation on a target video being played, wherein the display page is a video playing page, and the video playing page comprises the target video being played.

In some embodiments, the processor, when running the computer program, is enabled to perform the following step:

displaying at least one associated video on the display page; or skipping from the display page to a new page, and displaying the at least one associated video on the new page.

In some embodiments, the processor, when running the computer program, is enabled to perform the following step:

displaying the at least one associated video in a floating layer of the display page; or displaying the least one associated video on the display page in a fashion of embedding the display page.

In some embodiments, the processor, when running the computer program, is enabled to perform the following steps:

detecting a display cancellation indication of the at least one associated video; and cancelling the display of the at least one associated video according to the display cancellation indication.

In some embodiments, the display cancellation indication is generated in response to a click or tap signal on a region outside a target region; and the target region is a region corresponding to the at least one associated video in the display page.

In some embodiments, the display cancellation indication is generated in response to a click or tap signal on a masking layer which is set on the upper layer of a region outside a target region; and the target region is a region corresponding to the at least one associated video in the display page.

In some embodiments, the processor, when running the computer program, is enabled to perform the following step:

creating the masking layer on the upper layer of the region outside the target region when the at least one associated video is displayed.

In some embodiments, the processor, when running the computer program, is enabled to perform the following steps:

acquiring a target video recommendation list which includes at least one associated video after ranking; and displaying the at least one associated video in the target video recommendation list.

In some embodiments, the processor, when running the computer program, is enabled to perform the following steps:

acquiring an initial video recommendation list by ranking the at least one associated video of the target video; and acquiring the target video recommendation list by adjusting the initial video recommendation list according to an adjustment policy.

In some embodiments, the processor, when running the computer program, is enabled to perform the following step:

acquiring the target video recommendation list by ranking the at least one associated video according to a user behavior log; or acquiring the target video recommendation list by ranking the at least one associated video according to a similarity of each associated video.

In some embodiments, the processor, when running the computer program, is enabled to perform the following step:

acquiring the at least one associated video on the basis of the trigger signal by using a content-based recommendation algorithm; or acquiring the at least one associated video on the basis of the trigger signal by using a collaborative filtering recommendation algorithm.

Figure 9:
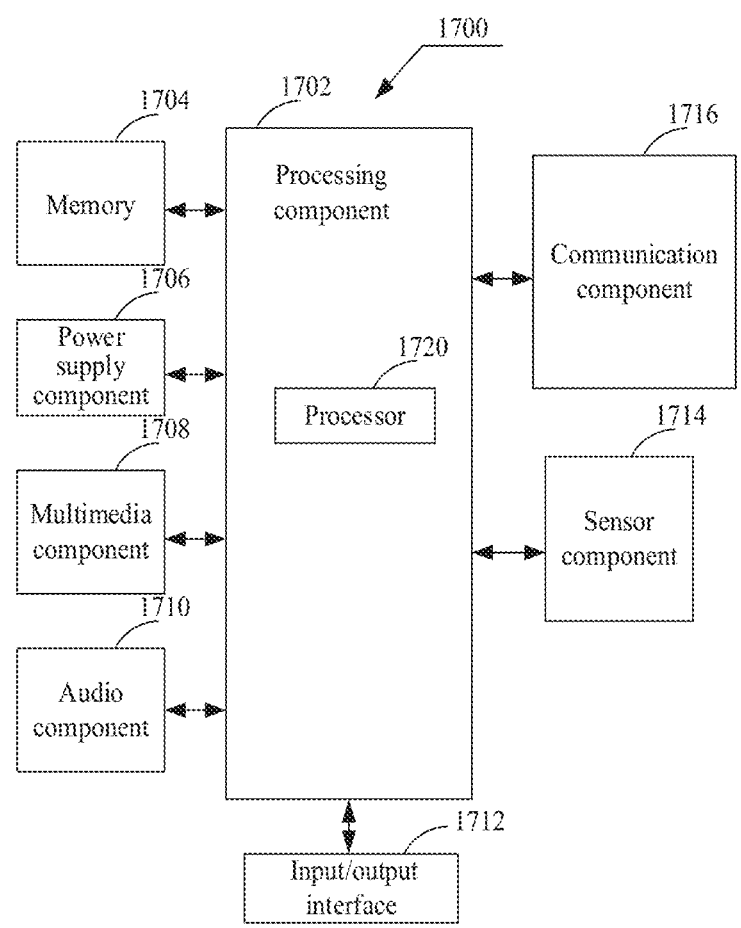
FIG. 9 is a schematic structural diagram of an electronic device according to an embodiment of the present disclosure.

As shown in FIG. 9, FIG. 9 is a schematic structural diagram of an electronic device 1700 according to an embodiment of the present disclosure. For example, the electronic device 1700 may be a mobile phone, a computer, a digital broadcast terminal, a message transceiver, a game console, a tablet device, a medical device, a fitness device, a personal digital assistant, or the like having a routing function.

Referring to FIG. 9, the electronic device 1700 may include one or more following components: a processing component 1702, a memory 1704, a power supply component 1706, a multimedia component 1708, an audio component 1710, an input/output (I/O) interface 1712, a sensor component 1714, and a communication component 1716.

The processing component 1702 typically controls overall operations of the electronic device 1700, such as the operations associated with display, telephone calls, data communications, camera operations and recording operations. The processing component 1702 includes one or more processors 1720 to execute instructions to realize all or part of the steps in the above described methods. Moreover, the processing component 1702 includes one or more modules which facilitate the interaction between the processing component 1702 and other components. For example, the processing component 1702 includes a multimedia module to facilitate the interaction between the multimedia component 1708 and the processing component 1702.

The memory 1704 is configured to store various types of data to support the operation of the electronic device 1700. Examples of such data include instructions for any applications or methods operated on the electronic device 1700, contact data, phonebook data, messages, pictures, videos, and the like. The memory 1704 is implemented by using any type of volatile or non-volatile memory devices, or a combination thereof, such as a static random-access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power supply source component 1706 provides power to various components of the electronic device 1700. The power supply source component 1706 includes a power supply management system, one or more power supplies, and any other components associated with the generation, management, and distribution of power in the electronic device 1700.

The multimedia component 1708 includes a screen providing an output interface between the electronic device 1700 and the user. In some embodiments, the screen includes a liquid crystal display (LCD) and a touch panel (TP). If the screen includes the touch panel, the screen is implemented as a touch screen to receive input signals from the user. The touch panel includes one or more touch sensors to sense touches, swipes, and gestures on the touch panel. The touch sensors can not only sense a boundary of a touch or swipe action, but also sense a period of time and a pressure associated with a touch or swipe action. In some embodiments, the multimedia component 1708 includes a front camera and/or a rear camera. The front camera and/or the rear camera can receive an external multimedia datum while the electronic device 1700 is in an operation mode, such as a photographing mode or a video mode. Each of the front and rear cameras is a fixed optical lens system or has a focus and optical zoom capability.

The audio component 1710 is configured to output and/or input audio signals. For example, the audio component 1710 includes a microphone (MIC) configured to receive an external audio signal when the electronic device 1700 is in an operation mode, such as a call mode, a recording mode, and a voice recognition mode. The received audio signal can be further stored in the memory 1704 or transmitted via the communication component 1716. In some embodiments, the audio component 1710 further includes a speaker used to output audio signals.

The I/O interface 1712 provides an interface between the processing component 1702 and peripheral interface modules, such as a keyboard, a click wheel, buttons, and the like. The buttons may include, but are not limited to, a home button, a volume button, a starting button, and a locking button.

The sensor component 1714 includes one or more sensors to provide the electronic device 1700 with status assessments of various aspects. For instance, the sensor component 1714 can detect an open/closed status of the electronic device 1700, relative positioning of components, e.g., a display and a keypad, of the electronic device 1700, a change in position of the electronic device 1700 or a component of the electronic device 1700, a presence or absence of user's contact with the electronic device 1700, an orientation or an acceleration/deceleration of the electronic device 1700, and a change in temperature of the electronic device 1700. The sensor component 1714 includes a proximity sensor configured to detect the presence of nearby objects without any physical contact. The sensor component 1714 further includes a light sensor, such as a CMOS or CCD image sensor, for use in imaging applications. In some embodiments, the sensor component 1714 further includes an accelerometer sensor, a gyroscope sensor, a magnetic sensor, a pressure sensor, or a temperature sensor.

The communication component 1716 is configured to facilitate wired or wireless communication between the electronic device 1700 and other devices. The electronic device 1700 can access a wireless network based on a communication standard, such as Wi-Fi, 2G, or 3G, or a combination thereof. In one example embodiment, the communication component 1716 receives a broadcast signal or broadcast associated information from an external broadcast management system via a broadcast channel In one example embodiment, the communication component 1716 further includes a near field communication (NFC) module to facilitate short-range communications. For example, the NFC module may be implemented based on the radio frequency identification (RFID) technology, infrared data association (IrDA) technology, ultra-wideband (UWB) technology, Bluetooth (BT) technology, and other technologies.

In example embodiments, the electronic device 1700 is implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the methods for playing the video in the above embodiments.

In an example embodiment, there is further provided a non-transitory computer-readable storage medium including an instruction, such as the memory 1704 including the instruction which is executable by the processor 1720 in the electronic device 1700 to perform the above-described method. For example, the non-transitory computer-readable storage medium may be a ROM, a RAM, a CD-ROM, a magnetic tape, a floppy disc, an optical data storage device, or the like.

Other embodiments of the present disclosure will be apparent to those skilled in the art from consideration of the specification and practice of the present disclosure disclosed here. The present disclosure is intended to cover any variations, uses, or adaptations of the present disclosure following the general principles thereof and including such departures from the present disclosure as come within known or customary practice in the art. It is intended that the description and examples be considered as examples only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be defined by the appended claims.

What is claimed is:

1. A method for displaying a video, comprising:
   detecting, on a display page of a target video, a first operation on the target video;
   generating a trigger signal in response to the first operation;
   acquiring, based on the trigger signal, at least one associated video of the target video; and
   displaying the at least one associated video,
   wherein the first operation is a touch operation on the display page of the target video, or a screenshot operation,
   wherein after displaying the at least one associated video, the method further comprises:
      detecting a display cancellation indication of the at least one associated video; and
      cancelling the display of the at least one associated video according to the display cancellation indication,
   wherein the display cancellation indication is generated in response to a click or tap signal on a masking layer which is set on an upper layer of a region outside a target region, the target region being a region corresponding to the at least one associated video in the display page.

2. The method according to claim 1, wherein said generating the trigger signal in response to the first operation comprises:
   generating the trigger signal in response to a first operation on a video cover of the target video, wherein the display page is a cover display page, the cover display page being configured to display a video cover of at least one video, the at least one video comprising the target video; or
   generating the trigger signal in response to the first operation on a target video being played, wherein the display page is a video playing page, and the video playing page comprises the target video being played.

3. The method according to claim 1, wherein said displaying the at least one associated video comprises:
   displaying the at least one associated video on the display page; or
   skipping from the display page to a new page, and displaying the at least one associated video on the new page.

4. The method according to claim 3, wherein said displaying the at least one associated video on the display page comprises:
   displaying the at least one associated video in a floating layer of the display page; or
   displaying the least one associated video on the display page in a way of embedding the display page.

5. The method according to claim 1, wherein the display cancellation indication is generated in response to a click or tap signal on a region outside a target region, the target region being a region corresponding to the at least one associated video in the display page.

6. The method according to claim 1, wherein prior to detecting the display cancellation indication of the at least one associated video, the method further comprises:
   creating the masking layer on the upper layer of the region outside the target region responsive to the at least one associated video being displayed.

7. The method according to claim 1, wherein said acquiring the at least one associated video of the target video and displaying the at least one associated video comprises:
   acquiring a target video recommendation list which comprises at least one associated video after ranking; and
   displaying the at least one associated video in the target video recommendation list.

8. The method according to claim 7, wherein said acquiring the target video recommendation list comprises:
   acquiring an initial video recommendation list by ranking the at least one associated video of the target video; and
   acquiring the target video recommendation list by adjusting the initial video recommendation list according to an adjustment policy.

9. The method according to claim 7, wherein said acquiring the target video recommendation list comprises:
   acquiring the target video recommendation list by ranking the at least one associated video according to a user behavior log; or
   acquiring the target video recommendation list by ranking the at least one associated video according to a similarity of each associated video.

10. The method according to claim 9, wherein the user behavior log records a number of at least one selected from clicks, taps, likes, forwards, or comments performed by users on the video.

11. The method according to claim 1, wherein said acquiring, based on the trigger signal, the at least one associated video of the target video comprises:
   acquiring the at least one associated video on the basis of the trigger signal by using a content-based recommendation algorithm; or
   acquiring the at least one associated video on the basis of the trigger signal by using a collaborative filtering recommendation algorithm.

12. The method according to claim 1, wherein the touch operation on the display page of the target video is a long-press operation, a double-click or double-tap operation, or a swiping operation in a preset direction.

13. An electronic device, comprising a memory storing a computer program therein, and a processor, wherein the computer program, when executed by the processor, causes the processor to perform a method comprising:
   detecting, on a display page of a target video, a first operation on the target video;
   generating a trigger signal in response to the first operation;
   acquiring, based on the trigger signal, at least one associated video of the target video; and
   displaying the at least one associated video,
   wherein the first operation is a touch operation on the display page of the target video, or a screenshot operation,
   wherein the method further comprises:
      detecting a display cancellation indication of the at least one associated video; and
      cancelling the display of the at least one associated video according to the display cancellation indication,
   wherein the display cancellation indication is generated in response to a click or tap signal on a masking layer which is set on an upper layer of a region outside a target region, the target region being a region corresponding to the at least one associated video in the display page.

14. The electronic device according to claim 13, wherein the method further comprises:
   generating the trigger signal in response to a first operation on a video cover of the target video, wherein the display page is a cover display page, the cover display page being configured to display a video cover of at least one video, the at least one video comprising the target video; or
   generating the trigger signal in response to the first operation on a target video being played, wherein the display page is a video playing page, and the video playing page comprises the target video being played.

15. The electronic device according to claim 13, wherein the method further comprises:
   displaying the at least one associated video on the display page; or
   skipping from the display page to a new page, and displaying the at least one associated video on the new page.

16. The electronic device according to claim 15, wherein the method further comprises:
   displaying the at least one associated video in a floating layer of the display page; or
   displaying the least one associated video on the display page in a fashion of embedding the display page.

17. The electronic device according to claim 13, wherein the method further comprises:
   acquiring a target video recommendation list which comprises at least one associated video after ranking; and
   displaying the at least one associated video in the target video recommendation list.

18. A non-transitory storage medium storing a computer program thereon, wherein the computer program, when executed by a processor, causes the processor to perform a method comprising:
   detecting, on a display page of a target video, a first operation on the target video;
   generating a trigger signal in response to the first operation;
   acquiring, based on the trigger signal, at least one associated video of the target video; and
   displaying the at least one associated video,
   wherein the first operation is a touch operation on the display page of the target video, or a screenshot operation,
   wherein after displaying the at least one associated video, the method further comprises:
      detecting a display cancellation indication of the at least one associated video; and
      cancelling the display of the at least one associated video according to the display cancellation indication,
   wherein the display cancellation indication is generated in response to a click or tap signal on a masking layer which is set on an upper layer of a region outside a target region, the target region being a region corresponding to the at least one associated video in the display page.

* * * * *